(12) United States Patent
Komoto et al.

(10) Patent No.: US 12,555,700 B2
(45) Date of Patent: Feb. 17, 2026

(54) CONDUCTIVE MEMBRANE TRANSFER SHEET AND METHOD FOR PRODUCING THE SAME, CONDUCTIVE OBJECT AND METHOD FOR PRODUCING THE SAME, AND CONDUCTIVE MEMBRANE

(71) Applicants: TOPPAN Holdings Inc., Tokyo (JP); Masato Kurihara, Yamagata (JP); Manabu Ishizaki, Yamagata (JP)

(72) Inventors: Kenji Komoto, Tokyo (JP); Hironori Ishikawa, Tokyo (JP); Masato Kurihara, Yamagata (JP); Manabu Ishizaki, Yamagata (JP)

(73) Assignees: TOPPAN Holdings Inc., Tokyo (JP); Masato Kurihara, Yamagata (JP); Manabu Ishizaki, Yamagata (JP)

( * ) Notice: Subject to any disclaimer, the term of this patent is extended or adjusted under 35 U.S.C. 154(b) by 314 days.

(21) Appl. No.: 18/189,694

(22) Filed: Mar. 24, 2023

(65) Prior Publication Data
US 2023/0260673 A1   Aug. 17, 2023

Related U.S. Application Data

(63) Continuation of application No. PCT/JP2021/035860, filed on Sep. 29, 2021.

(30) Foreign Application Priority Data

Oct. 1, 2020   (JP) .................. 2020-166964

(51) Int. Cl.
*H01B 5/14*   (2006.01)
*B32B 9/02*   (2006.01)
(Continued)

(52) U.S. Cl.
CPC ................ *H01B 5/14* (2013.01); *B32B 9/02* (2013.01); *B32B 9/045* (2013.01); *B32B 27/08* (2013.01);
(Continued)

(58) Field of Classification Search
CPC .......... B32B 2038/168; B32B 2250/24; B32B 2255/10; B32B 2255/20; B32B 2305/026;
(Continued)

(56) References Cited

U.S. PATENT DOCUMENTS

| | | |
|---|---|---|
| 7,205,028 B2 | 4/2007 | Iijima |
| 2009/0056854 A1 | 3/2009 | Oh et al. |
| 2017/0210627 A1* | 7/2017 | Jayasinghe .......... C01B 32/168 |

FOREIGN PATENT DOCUMENTS

| | | |
|---|---|---|
| EP | 3 174 705 B1 | 11/2019 |
| JP | H06-103839 A | 4/1994 |

(Continued)

OTHER PUBLICATIONS

Translation of JP2010269569, Akuta et al., Dec. 2, 2010. (Year: 2010).*

(Continued)

*Primary Examiner* — Hai Vo
(74) *Attorney, Agent, or Firm* — Maier & Maier, PLLC

(57) ABSTRACT

According to an embodiment of the present invention, a conductive membrane transfer sheet including a first release sheet and a conductive membrane is provided. The first release sheet includes a liquid-permeable sheet. The conductive membrane includes a conductive fiber supported on a first major surface of the first release sheet. The first release sheet and the conductive membrane contain a first liquid.

5 Claims, 1 Drawing Sheet

| | | | |
|---|---|---|---|
| (51) | Int. Cl. | | |
| | *B32B 9/04* | (2006.01) | |
| | *B32B 27/08* | (2006.01) | |
| | *B32B 27/30* | (2006.01) | |
| | *B32B 27/32* | (2006.01) | |
| | *B32B 37/00* | (2006.01) | |
| | *B32B 38/16* | (2006.01) | |
| | *H01B 13/00* | (2006.01) | |

(52) U.S. Cl.
CPC ........ *B32B 27/304* (2013.01); *B32B 27/322* (2013.01); *B32B 37/0038* (2013.01); *H01B 13/00* (2013.01); *B32B 2038/168* (2013.01); *B32B 2250/24* (2013.01); *B32B 2255/10* (2013.01); *B32B 2305/026* (2013.01); *B32B 2307/748* (2013.01); *B32B 2317/18* (2013.01); *B32B 2327/00* (2013.01); *B32B 2327/18* (2013.01)

(58) Field of Classification Search
CPC ........ B32B 2307/202; B32B 2307/412; B32B 2307/414; B32B 2307/726; B32B 2307/748; B32B 2317/18; B32B 2327/00; B32B 2327/18; B32B 27/08; B32B 27/10; B32B 27/304; B32B 27/322; B32B 29/005; B32B 37/0038; B32B 9/02; B32B 9/045; H01B 13/00; H01B 5/14
See application file for complete search history.

(56) References Cited

FOREIGN PATENT DOCUMENTS

| | | | |
|---|---|---|---|
| JP | 2002-347150 A | | 12/2002 |
| JP | 2006-035771 A | | 2/2006 |
| JP | 3903159 A | | 1/2007 |
| JP | 2008-126469 A | | 6/2008 |
| JP | 2010269569 A | * | 12/2010 |
| KR | 10-0791999 | | 1/2008 |

OTHER PUBLICATIONS

Extended European Search Report issued in counterpart European Application No. 21875694.8 dated Feb. 26, 2024.
Office Action issued on May 21, 2024, in corresponding Japanese Application No. 2022-112012, 11 pages.
International Search Report mailed Dec. 7, 2021 in corresponding PCT Application No. PCT/JP2021/035860 (3 pages) (2 pages English Translation).
Written Opinion mailed Dec. 7, 2021 in corresponding PCT Application No. PCT/JP2021/035860 (3 pages).
Yeji Kim et al.; "Transparent Conductive Carbon Nanotube Films Prepared by Wet Coating"; Electronics and Photonics Research Institute, National Institute of Advanced Industrial Science and Technology; vol. 64, No. 11, 2013; (4 pages).
English Translation of IPRP (PCT/IB/338 and PCT/IB/373) (Apr. 13, 2023 and Mar. 28, 2023) and the Written Opinion of ISA (PCT/ISA/237) issued in International Application No. PCT/JP2021/035860 dated Dec. 7, 2021 (5 pages).

* cited by examiner

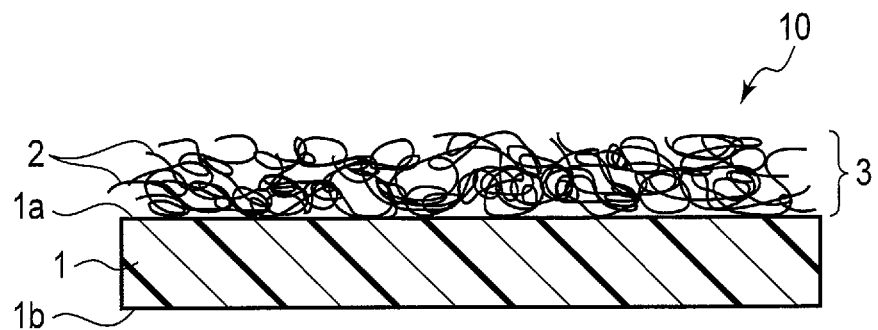
F I G. 1
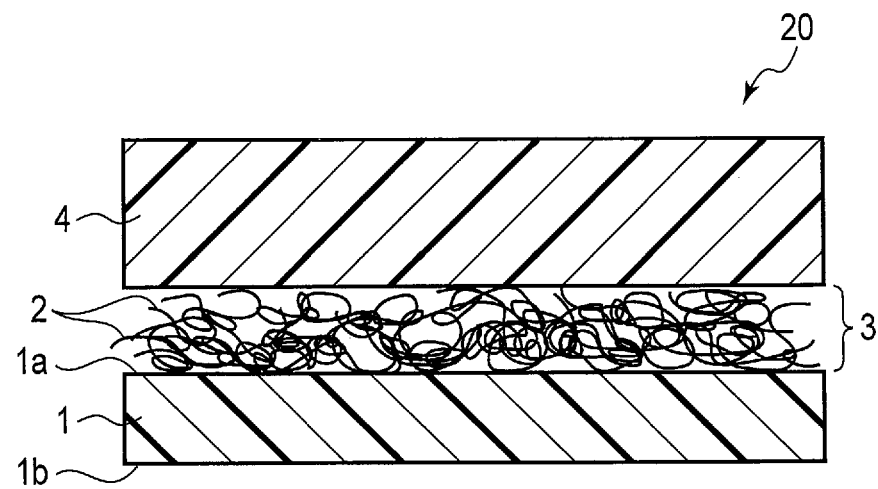
F I G. 2
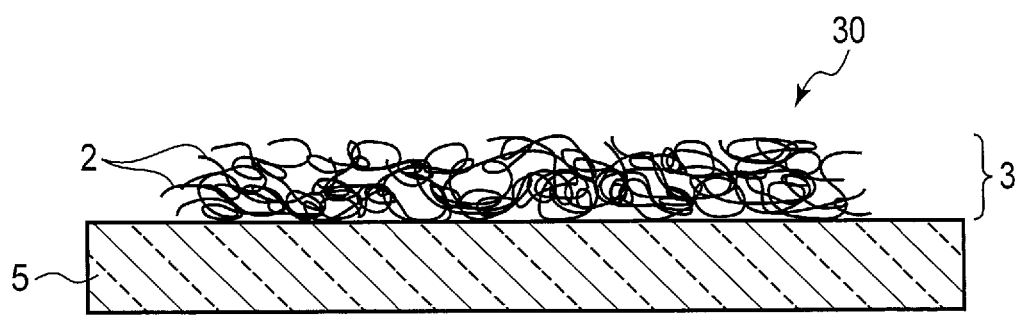
F I G. 3

CONDUCTIVE MEMBRANE TRANSFER SHEET AND METHOD FOR PRODUCING THE SAME, CONDUCTIVE OBJECT AND METHOD FOR PRODUCING THE SAME, AND CONDUCTIVE MEMBRANE

CROSS REFERENCE TO RELATED APPLICATIONS

This application is a Continuation Application of PCT Application No. PCT/JP2021/035860, filed Sep. 29, 2021 and based upon and claiming the benefit of priority from Japanese Patent Application No. 2020-166964, filed Oct. 1, 2020, the entire contents of all of which are incorporated herein by reference.

FIELD

The present invention relates to a conductive membrane transfer sheet and a method for producing the same, to a conductive object and a method for producing the same, and also to a conductive membrane.

BACKGROUND

A transparent conductive layer is usable as an antistatic layer, a transparent planar heat generator, a plasma display panel electrode, a liquid crystal electrode, an organic electroluminescence (EL) electrode, a touch panel, an electromagnetic wave shielding film, and so on.

Presently, the production of a transparent conductive membrane mainly relies on a sputtering method. The sputtering method is advantageous in its capacity for enabling the formation of a conductive membrane having a low surface resistance in even a relatively large area. The sputtering method, however, has drawbacks in that it requires a large-scaled installation and that the film formation rate is slow. Furthermore, since the sputtering method utilizes heating of a conductive material for film formation within vacuum equipment, it can adopt only the materials that can withstand such an environment.

Production of a transparent conductive membrane through a coating method is also on trial. The conventional coating method forms a conductive membrane by applying, onto a substrate, a conductive coating material containing a binder solution and conductive fine particles dispersed in the binder solution, and then subjecting the resultant to drying and curing. The coating method is advantageous in that it can easily form a large-area conductive membrane while using a simple installation and giving a high productivity, which allows for the production of conductive membranes at a lower cost than the sputtering method. According to the coating method, conductive properties are developed by having the conductive fine particles contact one another so as to form electric paths. However, the conductive membrane produced by the conventional coating method has a weakness in that it shows a high electric resistance (has a poor conductivity) due to the involvement of a binder that blocks sufficient contact between the conductive fine particles, and as such, the conductive membrane will have limited applications.

It is possible for the coating method to adopt conductive fibers such as carbon nanotubes capable of forming contact points more easily than conductive fine particles. Still, the coating generally utilizes mixing of a small amount of a binder in order to deal with issues including a thickness of the coating film for the formation of a conductive membrane, a strength of the formed film, etc., and this results in a low conductivity. As a method for forming a mono-material membrane of only carbon nanotubes, a technique is available in which a conductive membrane is first prepared by applying a coating liquid containing carbon nanotubes and a binder onto an adherend substrate and then the binder is thermally decomposed and removed by heating it to the decomposition temperature. This technique, however, requires use of a highly heat-resistant material for the substrate. Another method is bringing a substrate having a formed carbon-nanotube conductive layer into close contact with an adherend under high pressure and then dissolving and removing the substrate using a strong organic solvent. However, such a method likewise requires use of a solvent-resistant substrate as the adherend, and thus poses limitations to its use. Moreover, the solvent is used in a large amount, which raises concern about problems to the environment.

Patent Document 1 discloses a method for producing a transparent conductive substrate having a transparent conductive membrane by transfer.

Patent Document 2 discloses a transferring conductive membrane for transferring a transparent conductive layer onto a surface of a transfer target object. The transparent conductive layer carried by the transferring conductive membrane is formed of compressed conductive fine particles.

Patent Document 3 discloses more than one method that uses ultrafine conductive fibers as methods for producing a conductive article having a conductive layer on a substrate surface. According to one of these methods, a layer that has been obtained by applying an ultrafine conductive fiber dispersion liquid over a release film and performing drying is transferred by pressing the layer onto the substrate surface with an adhesive layer interposed and then peeling off the release film. However, Patent Document 3, which is silent of particulars about the adhesive layer, etc., does not describe the transfer method in more detail.

Patent Document 4 describes a method for producing a transferring conductive membrane. The transferring conductive membrane is constituted by a stack of a conductive layer and an adhesive layer provided on the conductive layer. The conductive layer is obtained by applying a coating liquid thickened with a mixture of a volatile solvent and a resin binder and containing ultrafine conductive fibers over a release film, followed by drying. The adhesive layer is made of an ultraviolet curable resin composition.

Non-Patent Document 1 describes a method for producing a carbon-nanotube conductive membrane.

CITATION LIST

Patent Literature

Patent Document 1
Jpn. Pat. Appln. KOKAI Publication No. H6-103839
Patent Document 2
Jpn. Pat. Appln. KOKAI Publication No. 2002-347150
Patent Document 3
Japanese Patent No. 3903159
Patent Document 4
Jpn. Pat. Appln. KOKAI Publication No. 2010-269569

Non-Patent Literature

Non-Patent Document 1
Surface Chemistry, P587, Vol. 64, No. 11, 2013

SUMMARY

Technical Problem

Conventionally, formation of a conductive membrane capable of showing a low surface resistance has required the use of large-scaled special installations such as a vapor deposition apparatus, a sputtering apparatus, etc., and this is accompanied by increased costs and complicated operations. Meanwhile, a transferring conductive membrane that carries a conductive membrane formed by a simple coating method has a weakness in that the formed conductive membrane will have a high surface resistance (have a poor conductivity), due to the use of a thickening agent for the conductive material to be applied to a substrate and also the use of a resin binder for the coated film to have an improved strength. If, for the sake of a lowered surface resistance, the resin binder is to be heated to a high temperature equal to or higher than the decomposition temperature for its removal, a problem must be assumed wherein the substrate, i.e., a transfer target, would be limited.

The present invention aims to provide a conductive membrane transfer sheet that allows for easy transfer of a highly conductive membrane without being restricted by the material, shape, etc. of a transfer target substrate, as well as to provide a method for producing the conductive membrane transfer sheet. The present invention also aims to provide a conductive object having a conductive membrane that is the membrane transferred from the conductive membrane transfer sheet, as well as to provide a method for producing the conductive object. The present invention also aims to provide a conductive membrane that is the membrane transferred from the conductive membrane transfer sheet.

Solution to Problem

The inventors of the present invention have conducted intense research in search of solutions to the foregoing problems. Consequently, the inventors have finally discovered that efficient and easy transfer of a highly conductive membrane which is not affected by the material, shape (such as a curved or flat surface), etc. of a transfer target substrate can be realized by: forming the conductive membrane through the steps of applying a dispersion liquid containing a solvent and conductive fibers dispersed in the solvent onto a liquid-permeable release sheet while keeping a low viscosity of the dispersion liquid by omitting addition of a thickening agent, and then removing a part of the solvent; and preparing a conductive membrane transfer sheet which is in the state of containing a part of the solvent. Based on this discovery, the inventors have completed the invention.

Embodiments of the present invention (hereinafter, "the present embodiments") include, for example, the following aspects.

(1): A conductive membrane transfer sheet including:
a first release sheet including a liquid-permeable sheet; and
a conductive membrane including a conductive fiber supported on a first major surface of the first release sheet,
wherein the first release sheet and the conductive membrane contain a first liquid.

(2): The conductive membrane transfer sheet according to (1), wherein a total mass of the first liquid contained in the first release sheet and the conductive membrane is in a range of 50 mass % to 200 mass % with respect to a mass of the first release sheet.

(3): The conductive membrane transfer sheet according to (1) or (2), wherein the first liquid contained in the first release sheet and the conductive membrane is a dispersion solvent of a dispersion liquid for the conductive fiber used for forming the conductive membrane.

(4): The conductive membrane transfer sheet according to any one of (1) to (3), wherein the first liquid is water or contains water.

(5): The conductive membrane transfer sheet according to any one of (1) to (4), including at least a carbon nanotube as the conductive fiber.

(6): The conductive membrane transfer sheet according to (5), further including, as the conductive fiber, a conductive fiber element other than the carbon nanotube.

(7): The conductive membrane transfer sheet according to any one of (1) to (6), wherein a pore size of the first release sheet is in a range of 0.05 μm to 5 μm.

(8): The conductive membrane transfer sheet according to any one of (1) to (7), wherein the first release sheet contains one or more materials selected from polytetrafluoroethylene, polyvinylidene fluoride, and cellulose.

(9): The conductive membrane transfer sheet according to any one of (1) to (8), further comprising a second release sheet, wherein
the conductive membrane is located between the first release sheet and the second release sheet, and
the second release sheet contains a liquid equivalent to the first liquid.

(10): A method for producing the conductive membrane transfer sheet of any one of (1) to (8), the method comprising:
forming a precursor membrane of the conductive membrane by applying, onto the first major surface of the first release sheet, a dispersion liquid including the first liquid and the conductive fiber dispersed in the first liquid; and
forming the conductive membrane by removing a part of the first liquid from a second major surface side of the first release sheet which is opposite the first major surface.

(11): A method for producing the conductive membrane transfer sheet of (9), the method comprising:
forming a precursor membrane of the conductive membrane by applying, onto the first major surface of the first release sheet, a dispersion liquid including the first liquid and the conductive fiber dispersed in the first liquid;
forming the conductive membrane by removing a part of the first liquid from a second major surface side of the first release sheet which is opposite the first major surface; and
providing, on the conductive membrane, the second release sheet containing the liquid equivalent to the first liquid, so that the conductive membrane is located between the first release sheet and the second release sheet.

(12): A method for producing the conductive membrane transfer sheet of any one of (1) to (8), in which the first liquid is replaced with a second liquid compatible with the first liquid, the method comprising:
forming a precursor membrane of the conductive membrane by applying, onto the first major surface of the first release sheet, a dispersion liquid including the first liquid and the conductive fiber dispersed in the first liquid;

forming the conductive membrane by removing a part of the first liquid from a second major surface side of the first release sheet which is opposite the first major surface;
applying the second liquid onto the conductive membrane to replace a remaining part of the first liquid with the second liquid; and
removing a part of the second liquid from the second major surface side of the first release sheet.

(13): A method for producing the conductive membrane transfer sheet of (9), in which the first liquid is replaced with a second liquid compatible with the first liquid, the method comprising:
first release sheet, a dispersion liquid including the first liquid and the conductive fiber dispersed in the first liquid;
forming the conductive membrane by removing a part of the first liquid from a second major surface side of the first release sheet which is opposite the first major surface;
applying the second liquid onto the conductive membrane to replace a remaining part of the first liquid with the second liquid;
removing a part of the second liquid from the second major surface side of the first release sheet; and
providing, on the conductive membrane, the second release sheet containing a liquid equivalent to the second liquid, so that the conductive membrane is located between the first release sheet and the second release sheet.

(14): A method for producing the conductive membrane transfer sheet of any one of (1) to (8), in which the first liquid is replaced with a third liquid incompatible with the first liquid, the method comprising:
forming a precursor membrane of the conductive membrane by applying, onto the first major surface of the first release sheet, a dispersion liquid including the first liquid and the conductive fiber dispersed in the first liquid;
forming the conductive membrane by removing a part of the first liquid from a second major surface side of the first release sheet which is opposite the first major surface;
applying a second liquid compatible with both the first liquid and the third liquid onto the conductive membrane to replace a remaining part of the first liquid with the second liquid;
removing a part of the second liquid from the second major surface side of the first release sheet;
applying the third liquid onto the conductive membrane to replace a remaining part of the second liquid with the third liquid; and
removing a part of the third liquid from the second major surface side of the first release sheet.

(15): A method for producing the conductive membrane transfer sheet of (9), in which the first liquid is replaced with a third liquid incompatible with the first liquid, the method comprising:
forming a precursor membrane of the conductive membrane by applying, onto the first major surface of the first release sheet, a dispersion liquid including the first liquid and the conductive fiber dispersed in the first liquid;
forming the conductive membrane by removing a part of the first liquid from a second major surface side of the first release sheet which is opposite the first major surface;
applying a second liquid compatible with both the first liquid and the third liquid onto the conductive membrane to replace a remaining part of the first liquid with the second liquid;
removing a part of the second liquid from the second major surface side of the first release sheet;
applying the third liquid onto the conductive membrane to replace a remaining part of the second liquid with the third liquid;
removing a part of the third liquid from the second major surface side of the first release sheet; and
providing, on the conductive membrane, the second release sheet containing a liquid equivalent to the third liquid, so that the conductive membrane is located between the first release sheet and the second release sheet.

(16): The method according to any one of (10) to (15) for producing the conductive membrane transfer sheet, wherein the first liquid, the second liquid, or the third liquid is removed from the second major surface side of the first release sheet by conducting suction on the second major surface side.

(17): A conductive object comprising:
a substrate which is a transfer target; and
the conductive membrane transferred from the conductive membrane transfer sheet of any one of (1) to (9), the conductive membrane being located on the substrate.

(18): The conductive object according to (17), wherein the substrate and the conductive membrane are bonded to each other through van der Waals force generated by removal of the first liquid in transfer of the conductive membrane from the conductive membrane transfer sheet to the substrate.

(19): A method for producing a conductive object comprising a substrate and a conductive membrane on the substrate, the method comprising:
bringing the conductive membrane of the conductive membrane transfer sheet of any one of (1) to (8) into contact with the substrate;
removing the first liquid contained in the first release sheet and the conductive membrane by heat application; and
peeling off the first release sheet.

(20): A method for producing a conductive object comprising a substrate and a conductive membrane on the substrate, the method comprising:
peeling the second release sheet from the conductive membrane transfer sheet of (9);
bringing the conductive membrane into contact with the substrate;
removing the first liquid contained in the first release sheet and the conductive membrane by heat application; and
peeling off the first release sheet.

(21): A conductive membrane that is a membrane transferred from the conductive membrane transfer sheet of any one of (1) to (9).

(22): The conductive membrane according to (21), having a surface resistance in a range of 1 to 10 k$\Omega$/cm$^2$.

(23): The conductive membrane according to (21) or (22), having a transmittance of 50% or more for light of a 550 nm wavelength.

Advantageous Effects of Invention

With the present invention, it is now possible to provide a conductive membrane transfer sheet that allows for easy transfer of a highly conductive membrane without limitations to the material, shape, etc. of a transfer target substrate, and also a method for producing the conductive membrane transfer sheet. Moreover, it is now possible with the present invention to provide a conductive object having a conductive membrane that is the membrane transferred from the conductive membrane transfer sheet, and also a method for producing the conductive object. Still more, it is now possible with the present invention to provide a conductive membrane that is the membrane transferred from the conductive membrane transfer sheet.

BRIEF DESCRIPTION OF THE DRAWINGS

FIG. 1 is a sectional view schematically showing an example of a conductive membrane transfer sheet according to a first embodiment of the present invention.

FIG. 2 is a sectional view schematically showing an example of a conductive membrane transfer sheet according to a second embodiment of the present invention.

FIG. 3 is a sectional view schematically showing an example of a conductive object according to a third embodiment of the present invention.

DETAILED DESCRIPTION

The present embodiments will be described with reference to the drawings. Note that the description will use the same reference signs for the elements having the same or similar functions so that repetitive explanations will be avoided.

First Embodiment

FIG. 1 is a sectional view schematically showing an example of a conductive membrane transfer sheet according to the first embodiment of the present invention. A conductive membrane transfer sheet 10 shown in FIG. 1 includes a first release sheet 1 constituted by a liquid permeable sheet, and a conductive membrane 3 including a conductive fiber or fibers 2 supported on one major surface (hereinafter, a "first major surface") 1a of the first release sheet 1. The first release sheet 1 and the conductive membrane 3 contain a liquid (hereinafter, a "first liquid"), while not illustrated here.

The first liquid contained in the first release sheet 1 and the conductive membrane 3 is a dispersion solvent of a dispersion liquid for the conductive fiber 2 used for forming the conductive membrane 3, and the first release sheet 1 and the conductive membrane 3 are wet with the first liquid. The first liquid contained in the first release sheet 1 and the conductive membrane 3 play an important role for the transferability of the conductive membrane 3 to a transfer target. As will be described in more detail later, removal of the first liquid from the conductive membrane transfer sheet 10 by heat application during the transfer process generates a van der Waals force which makes a strong bond between a transfer target and the conductive membrane 3.

The amount of the first liquid contained in the first release sheet 1 and the conductive membrane 3 is set as appropriate in light of the film-forming properties of the conductive membrane 3, the transferability of the conductive membrane 3 to transfer targets, and so on. In one embodiment, the total mass of the first liquid contained in the first release sheet 1 and the conductive membrane 3 with respect to the mass of the first release sheet is preferably in a range of 50 mass % to 200 mass %, more preferably in a range of 100 mass % to 180 mass %, and even more preferably in a range of 120 mass % to 170 mass %.

(Conductive Membrane)

The conductive membrane 3 includes conductive fiber or fibers 2 and the first liquid. The conductive membrane 3 is formed by removing a part of the first liquid from a precursor membrane constituted by a dispersion liquid containing the first liquid and the conductive fibers 2 dispersed in the first liquid. The removal of the first liquid is conducted by sucking up the first liquid from a surface 1b side of the first release sheet 1 which is a surface opposite the first major surface 1a (hereinafter, the surface 1b will be called a "second major surface"). The conductive membrane 3 is not limited to particular thicknesses, and the thickness of the conductive membrane 3 is adjusted as appropriate according to its use, etc. Note that the thickness of the conductive membrane 3 can be adjusted using the application amount of the dispersion liquid containing the conductive fibers 2, the concentration of the conductive fibers 2 in the dispersion liquid, etc.

(Conductive Fibers)

Examples of the conductive fibers 2 applicable to the present embodiments include: carbon fibers such as carbon nanotubes (CNT), carbon nanohorns, carbon nanowires, carbon nanofibers, and graphite fibrils; metal fibers such as metal nanotubes or nanowires of platinum, gold, silver, nickel, and silicon; and metal oxide fibers such as metal oxide nanotubes or metal oxide nanowires of zinc oxide. It is preferable that the conductive fibers each have a diameter in a range of, for example, 0.3 to 100 nm and a length in a range of, for example, 0.1 to 20 μm, which is more preferably 0.1 to 10 μm. Among these conductive fibers, carbon nanotubes have a very small diameter of 0.3 to 80 nm, and their aspect ratio is large. Accordingly, carbon nanotubes very rarely block transmission of light, and are preferred for the sake of obtaining transparent conductive membranes. Further, carbon nanotubes show excellent conductivity, and thus are capable of reducing the surface resistance of the conductive membranes. The present embodiments may employ one kind of conductive fibers or two or more kinds of conductive fibers.

The carbon nanotubes discussed above include multi-walled carbon nanotubes (MWNT) and single-walled carbon nanotubes (SWNT). A multi-walled carbon nanotube (MWNT) has a number of concentrically present tubes differing in diameter and each constituted by a cylindrical carbon wall closed around the central axis. The carbon wall is formed to have a hexagonal network structure. In some multi-walled carbon nanotubes, a carbon wall is rolled to form multiple layers. A preferred multi-walled carbon nanotube has 2- to 30-ply carbon walls, and a more preferred multi-walled carbon nanotube has 2- to 15-ply carbon walls. Use of such multi-walled carbon nanotubes enables formation of a conductive membrane showing an excellent light transmittance. Normally, multi-walled carbon nanotubes are dispersed individually and separately from one another. In some instances, multiple 2- to 3-ply carbon nanotubes together form a bundle and such bundles are dispersed in this manner.

A single-walled carbon nanotube (SWNT) has a single cylindrical carbon wall closed around the central axis. Single-walled carbon nanotubes show a low resistance as compared to multi-walled carbon nanotubes, and therefore, they are more preferable than multi-walled carbon nanotubes. The carbon wall of a single-walled carbon nanotube is formed to have a hexagonal network structure. Individually dispersing such single-walled carbon nanotubes is difficult. Two or more tubes together form a bundle, and such bundles are entwined with one another. Nevertheless, these bundles do not agglomerate or intricately intertwine with each other. The bundles simply cross each other and contact each other at their intersections, and they are in a uniformly dispersed state over the surface. A preferred bundle of the single-walled carbon nanotubes is formed of a set of 10 to 50 tubes. However, the present embodiments can suitably adopt single-walled carbon nanotubes separated from one another and individually dispersed.

(First Liquid)

The first liquid is not particularly limited and may be any liquid as long as it serves as a solvent capable of dispersing the conductive fibers 2. In instances where the present embodiments use carbon nanotubes as the conductive fibers, the first liquid may be any of water, acetone, methyl ethyl ketone, methanol, ethanol, isopropanol, and so on. The first liquid may also be a mixed solvent containing two or more selected from these. Among them, water and alcohol are preferred, and water is particularly preferred since it is capable of dispersing the carbon nanotubes relatively uniformly. In one embodiment, it is preferable that the first liquid be water or include water.

(Conductive Auxiliary Agents)

In the present embodiments, the conductive membrane 3 may contain a conductive auxiliary agent or agents for the purposes of increasing the conductivity, enhancing the membrane strength, etc. Such conductive auxiliary agents may be: conductive polymers such as PEDOT/PSS, polypyrrole, and polyaniline; and conductive metals such as fine particles or fibers of gold, silver, copper, etc.

(First Release Sheet)

The first release sheet 1 is a liquid permeable sheet. A liquid permeable sheet applicable to the present embodiments may be any sheet as long as it has such a permeability as to permit the first liquid to be removed from the dispersion liquid for the conductive fibers 2 while keeping the conductive substances including the conductive fibers 2 on the sheet. Concrete examples of such a liquid permeable sheet include a variety of porous membrane filters and nonwoven fabric filters. The pore size of the first release sheet 1 is set as appropriate according to the above viewpoint. For example, a liquid permeable sheet having a suitable pore size for the length, etc. of the conductive fibers 2 may be selected. In the present embodiments, it is preferable that the first release sheet have a pore size in a range of, for example, 0.05 µm to 5.0 µm, which is more preferably 0.1 µm to 2.0 µm. The pore size here is a value measured by a method according to the testing method for bubble points as stipulated in JIS K3832.

Material of the first release sheet 1 may be any of polytetrafluoroethylene (PTFE), polyvinylidene fluoride (PVDF), polyvinylidene chloride (PVDC), polypropylene (PP), polyethylene (PE), cellulose, cellulose acetate, polycarbonate, and so on. Among these, PTFE, PVDF, and cellulose are preferred. The first release sheet 1 may be made of a single material selected from them, or of a mixture of two or more materials selected from them.

The first release sheet 1 is not limited to particular thicknesses. For example, a sheet having a thickness of 10 to 200 µm may be employed.

(Production Method)

In the present embodiments, the conductive membrane transfer sheet 10 shown in FIG. 1 is obtained, for example, in the following manner.

First, a dispersion liquid containing the first liquid and the conductive fibers 2 dispersed in the first liquid is applied onto the first major surface 1a of the first release sheet 1 to obtain a precursor membrane of the conductive membrane 3. This dispersion liquid may be prepared by, for example, adding the first liquid to a commercially available carbon nanotube dispersion liquid with a state of uniform dispersion maintained. The concentration of carbon nanotubes in the dispersion liquid may be in a range of, for example, 0.001 to 0.5 mass %. A method for applying the dispersion liquid is not particularly limited. The dispersion may be directly poured onto the first major surface 1a, or any known application method such as spraying may be used.

Next, the conductive membrane 3 having a desired thickness is formed by removing a part of the first liquid from the second major surface 1b side, which is the opposite surface to the first major surface 1a of the first release sheet 1 on which the precursor membrane of the conductive membrane 3 has been formed. Removal of a part of the first liquid from the second major surface 1b side of the first release sheet 1 causes the conductive fibers 2 to closely contact one another so that the conductive membrane 3 can be obtained as a to-be-transferred layer on the first release sheet 1. Here, the first release sheet 1 and the conductive membrane 3 are wet with the first liquid left unremoved. If these members are not wet but dry, or if the amount of the contained first liquid is too small, a risk of defects such as the conductive membrane 3 being incapable of transferring or the occurrence of a partial transfer failure could arise. The preferred ranges of the total mass of the first liquid contained in the first release sheet 1 and the conductive membrane 3 is as noted above.

It is suitable to conduct the removal of the first liquid from the second major surface 1b side of the first release sheet 1 at once by sucking up the first liquid. Examples of the sucking means include vacuum suction with an aspirator or the like, a method of absorbing the first liquid by placing a water-absorbing or oil-absorbing material in contact with the second major surface 1b, and so on.

Depending on a transfer target, which can have a poor affinity with the first liquid contained in the conductive membrane 3, the transfer using the conductive membrane transfer sheet 10 might result in defects such as inability to transfer or an occurrence of a partial transfer failure. This issue can be addressed by replacing the first liquid contained in the first release sheet 1 and the conductive membrane 3 of the conductive membrane transfer sheet 10 with a liquid having a good affinity with the transfer target. For example, the first liquid contained in the conductive membrane transfer sheet 10 may be replaced with another liquid in the following manner.

Here, separate descriptions will be given of respective instances where this "another liquid" having a good affinity with the transfer target is a liquid compatible with the first liquid (such a compatible liquid will be called a "second liquid"), and where the liquid is incompatible with the first liquid (such an incompatible liquid will be called a "third liquid"). The term "compatible" herein means that in the state where the first liquid and the second liquid are mixed, these liquids are not separated from each other and no interface is formed. For example, the term "compatible" is true of the relationship between water serving as the first liquid and ethanol serving as the second liquid. Also, the term "incompatible" herein means that in the state where the first liquid and the third liquid are mixed, these liquids are separated from each other and an interface is formed. For example, the term "incompatible" is true of the relationship between water serving as the first liquid and toluene serving as the third liquid.

As a method for replacing the first liquid contained in the conductive membrane transfer sheet 10 with the second liquid compatible with the first liquid, the second liquid is first applied onto the conductive membrane 3 of the conductive membrane transfer sheet 10 that has been obtained in the above manner and that contains the first liquid. The application of the second liquid onto the conductive membrane 3 is conducted in a mode where the first liquid contained in the first release sheet 1 and the conductive membrane 3 is rinsed away with the second liquid and the first liquid contained in the first release sheet 1 and the conductive membrane 3 can be thereby replaced with the second liquid. Next, removal of a part of the second liquid is conducted from the second major surface 1b side of the first release sheet 1. From the foregoing, the conductive membrane transfer sheet 10 in which the first liquid has been replaced with the second liquid and the first release sheet 1 and the conductive membrane 3 are now wet with the second liquid can be obtained. Note that the application of the second liquid may be conducted in a similar manner to the above-described method for applying the dispersion liquid, and the liquid removal from the second major surface 1b side of the first release sheet 1 may be conducted in a similar manner to the above-described method for removing the first liquid.

As a method for replacing the first liquid contained in the conductive membrane transfer sheet 10 with the third liquid incompatible with the first liquid, replacement with a compatible liquid may be sequentially repeated. In other words, using the second liquid that is compatible with both the first liquid and the third liquid, the first liquid is first replaced with the second liquid, and then the second liquid is replaced with the third liquid.

More specifically, the third liquid is applied onto the conductive membrane 3 of the conductive membrane transfer sheet in which the first liquid has been replaced with the second liquid by the method described above. The application of the third liquid onto the conductive membrane 3 is conducted in a mode where the second liquid contained in the first release sheet 1 and the conductive membrane 3 is rinsed away with the third liquid and the second liquid contained in the first release sheet 1 and the conductive membrane 3 can be thereby replaced with the third liquid. Next, removal of a part of the third liquid is conducted from the second major surface 1b side of the first release sheet 1. From the foregoing, the conductive membrane transfer sheet 10 in which the second liquid has been replaced with the third liquid and the first release sheet 1 and the conductive membrane 3 are now wet with the third liquid can be obtained. Note that the application of the third liquid may be conducted in a similar manner to the above-described method for applying the dispersion liquid, and the liquid removal from the second major surface 1b side of the first release sheet 1 may be conducted in a similar manner to the above-described method for removing the first liquid.

Second Embodiment

FIG. 2 is a sectional view schematically showing an example of a conductive membrane transfer sheet according to the second embodiment of the present invention. A conductive membrane transfer sheet 20 shown in FIG. 2 corresponds to the conductive membrane transfer sheet 10 shown in FIG. 1 with a second release sheet 4 additionally included, in which the conductive membrane 3 is sandwiched between the first release sheet 1 and the second release sheet 4.

The second release sheet 4 contains a liquid equivalent to the first liquid contained in the first release sheet 1 and the conductive membrane 3. In the conductive membrane transfer sheet 20, the second release sheet 4 is arranged such that the conductive membrane 3 is sandwiched between it and the first release sheet 1, so as to prevent the conductive membrane transfer sheet from drying and to accordingly maintain a long-lasting and reliable transferability. This secures the stability in storage of the conductive membrane transfer sheet 20 and improves the convenience.

Materials of the second release sheet 4 are not particularly limited as long as they can sufficiently absorb and retain the liquid equivalent to the first liquid so that the conductive membrane 3 containing the first liquid will not dry in the state where the second release sheet 4 and the conductive membrane 3 are bonded to each other. For example, if water is used as a dispersion solvent (the first liquid) for dispersing the conductive fibers 2, a water-absorbing gel sheet of sodium polyacrylate, polyacrylamide, agar, carrageenan, or the like, or water-absorbing paper, etc. may be used. If an organic solvent is used as the dispersion solvent (the first liquid), various oil-absorbing polymer sheets, etc. adapted to absorb and retain such a solvent may be used.

Note that the conductive membrane transfer sheet may be subjected to the above-described method for replacing the first liquid contained in the first release sheet 1 and the conductive membrane 3 with the second liquid or the third liquid. In such instances, a liquid equivalent to the liquid after completion of the replacement is used as the liquid contained in the second release sheet 4.

The conductive membrane transfer sheet 20 shown in FIG. 2 is obtained by providing the second release sheet 4, into which the first liquid has been sufficiently introduced in advance, to the conductive membrane transfer sheet 10 which is as shown in FIG. 1 and which has been obtained by the above-described method, in such a manner that the second release sheet 4 is laid on a surface of the conductive membrane 3 not in contact with the first release sheet 1. As discussed above, the second release sheet 4 is employed in order to prevent the conductive membrane 3, i.e., a to-be-transferred layer of the conductive membrane transfer sheet, from drying and becoming cured before it is transferred to a transfer target. Thus, the second release sheet 4 is placed and bonded to the conductive membrane 3 while keeping the conductive membrane 3 in the wet state.

It is preferable that, after peeling off of the second release sheet 4, the total mass of the first liquid contained in the first release sheet 1 and the conductive membrane 3 in the conductive transfer sheet 20 be approximately the same as the total mass of the first liquid content as discussed for the conductive membrane transfer sheet 10 according to the first embodiment. That is, such a total mass may be in the range of 50 mass % to 200 mass %, in the range of 100 mass % to 180 mass %, or in the range of 120 mass % to 170 mass %, with respect to the mass of the first release sheet 1.

Note that the conductive membrane transfer sheets according to the present embodiments, including both the first embodiment and the second embodiment, are desirably stored in a storage bag or a sealed case capable of being completely sealed until use, such as an aluminum-laminated pouch, so as to maintain the wet state of the first release sheet 1 and the conductive membrane 3.

Third Embodiment

FIG. 3 is a sectional view schematically showing an example of a conductive object according to the third embodiment of the present invention. A conductive object 30 shown in FIG. 3 includes a substrate 5 which is a transfer target, and a conductive membrane 3 located on the substrate 5 as a membrane transferred from the conductive membrane transfer sheet according to any of the present embodiments.

The conductive object 30 shown in FIG. 3 is obtained, for example, in the following manner.

The description will assume a case where the conductive membrane transfer sheet according to the embodiment includes the second release sheet. In this case, the second release sheet 4 is first peeled off from the conductive membrane transfer sheet 20. Next, the surface of the conductive membrane 3 from which the second release sheet 4 has been removed is brought into contact with the substrate 5. Here, the contact between the substrate 5 and the conductive membrane 3 is preferably made under pressure so that no air bubbles enter between them. Next, the first liquid contained in the first release sheet 1 and the conductive membrane 3 is removed by heat application. The removal of the first liquid generates van der Waals force, which causes the substrate 5 and the conductive membrane 3 to be strongly bonded together. Examples of the heating means include heating with a dryer or the like for applying hot air to the second major surface 1b side of the first release sheet 1, or heating with a heater or the like from below. After the removal of the first liquid, the first release sheet is peeled off so that the transfer of the conductive membrane 3 to the substrate 5 is completed and the conductive object 30 can be thereby obtained.

As described above, each conductive membrane transfer sheet according to the present embodiments allows for simple and easy transfer of its conductive membrane through evaporation of the liquid contained in the sheet by hot air from a dryer, etc., without using a special apparatus. This enables easy formation of a conductive membrane on even a substrate having a low heat resistance.

Each conductive membrane transfer sheet according to the present embodiments makes it possible to provide a highly conductive object through transfer of its conductive membrane to a transfer target by this simple and easy method. The obtained conductive object is usable as an antistatic layer, a transparent planar heat generator, a plasma display panel electrode, a liquid crystal electrode, an organic EL electrode, a touch panel, an electromagnetic wave shielding film, and so on.

Each conductive membrane according to the present embodiments uses conductive fibers into which no non-conductive substances such as a resin binder are mixed, unlike in the conventional conductive materials. Thus, it shows a very small surface resistance and can provide a conductive object having an excellent conductivity through transfer. As one form, the conductive membrane transfer sheet according to the present embodiments can provide a conductive membrane having a surface resistance in a range of 1 to 10 k$\Omega$/cm$^2$.

Moreover, each conductive membrane according to the present embodiments may be transferred to a transparent film, a transparent glass, and the like to realize a transparent conductive film, a transparent conductive glass, and the like, which are applicable to various types of displays, etc. As one form, the conductive membrane transfer sheet according to the present embodiments can provide a conductive membrane having a transmittance of 50% or more for light of a 550 nm wavelength.

Also, each conductive membrane according to the present embodiments, being formed of conductive fibers, is more resistant to deformation including repeated bending actions than inorganic conductive membranes of ITO, tin oxide, etc. As such, each can be used as a flexible conductor.

With the conductive membrane transfer sheet according to any of the present embodiments as described above, it is possible to form a highly conductive membrane on any transfer target substrate that can have various shapes, regardless of a material, a type, etc. of the substrate, by placing the transfer sheet in close contact with the substrate along with a curved shape, an uneven shape, or other shape of the substrate. Note also that the conductive membrane transfer sheet according to any of the present embodiments is further applicable to instances where the transfer target is a substrate having a hollow central portion or a frame shape. A conductive membrane transferring process to such a substrate can produce a conductive membrane that is partially or almost not in contact with the substrate, which can be used as a mono-material conductive membrane. For example, a protective membrane or the like can be produced using the conductive membrane transfer sheet according to any of the present embodiments. Still more, the conductive membranes according to the present embodiments are not limited to the use for which conductive properties are essential. Thus, the conductive membrane transfer sheets according to the present embodiments are usable in a wide range of fields.

EXAMPLES

The present invention will be described in more concrete terms using working examples below. Note, however, that the present invention is not limited to these examples.

Example 1

<Preparation of Conductive Membrane Transfer Sheet>

An aqueous dispersion of conductive fibers, commercially available single-walled carbon nanotubes (SWNT) each having a diameter of 1 to 3 nm, was used. Pure water was added to this aqueous dispersion while its uniform dispersion state was maintained, so that a dispersion liquid having a SWNT concentration of 0.02 mass % was prepared.

Then, this dispersion liquid was sprayed onto a PTFE sheet (the first release sheet; diameter 47 mm$\varphi$, film thickness 65 µm, sheet pore size 0.2 µm) using an air brush having a nozzle diameter of 0.3 mm. Water was drawn by sucking the opposite surface of the PTFE sheet with an aspirator, and a conductive membrane was thereby furnished on the sheet. The obtained conductive membrane transfer sheet had a liquid content, which is represented by Formula (1) below, of 163 mass %.

[(Total mass of liquid contained in the first release sheet and the conductive membrane)/mass of the first release sheet]×100(%)  Formula (1)

<Preparation (Transfer Test) of Conductive Object>

The surface of the conductive membrane was attached to a PET film having a thickness of approximately 100 µm using a suitable pressure so as not to trap air bubbles. Then, the obtained stack was, via its side of the PET film, brought into contact with a hot plate of approximately 90° C. and drying was conducted for sufficient water-content reduction. Subsequently, the first release sheet was slowly peeled off from the edge to obtain a conductive membrane as a transfer product on the PET film. The surface resistance and the transmittance of the obtained transfer product were measured by the following methods and the transferability was evaluated based on the following criteria. The results are shown in Table 1.

(Method for Measuring Surface Resistance)

The surface resistance was measured by a four-terminal method using a resistance meter, Loresta GP MCP-T610 (Mitsubishi Chemical Analytech Co., Ltd.).

(Method for Measuring Transmittance)

For the transmittance, a transmittance of a set of the conductive membrane and the PET substrate was measured for light of a 550 nm wavelength using a spectrophotometer, U-4100 (Hitachi High-Technologies Corporation).

(Transferability)

A: Fully transferred. (100% of the transferable region)

B: Almost fully transferred. (90% or more and less than 100% of the transferable region)

C: Half or more transferred. (50% or more and less than 90% of the transferable region)

D: Partly transferred. (More than 0% and less than 50% of the transferable region)

E: Not transferred at all. (0% of the transferable region)

Examples 2 to 6

<Preparation of Conductive Membrane Transfer Sheet>

Using the same material as in Example 1, a conductive membrane was provided on the first release sheet. The thickness of each conductive membrane was adjusted with a time of spraying the dispersion liquid by the air brush. Commercially available qualitative filter paper made of cellulose (diameter 50 mmφ, thickness 0.5 mm) was immersed in pure water, taken out in a sufficient water-containing state, and attached as the second release sheet from above the conductive membrane to thereby prepare a conductive membrane transfer sheet. Each conductive membrane transfer sheet was stored in a zippered aluminum laminate bag for preventing the sheet from drying. The sheet was taken out after a predetermined period noted in Table 1 in the item "Time to transfer", and used as a transfer sheet in the following transfer test.

<Preparation (Transfer Test) of Conductive Object>

After the predetermined period, the conductive membrane transfer sheet was taken out from the aluminum laminate bag. The second release sheet was then peeled off, and the surface of the conductive membrane was attached to a PET film having a thickness of 100 μm using a suitable pressure so as not to trap air bubbles. Then, the obtained stack was, via its side of the PET film, brought into contact with a hot plate of approximately 90° C. and drying was conducted for sufficient water-content reduction. Subsequently, the first release sheet was slowly peeled off from the edge to obtain a conductive membrane as a transfer product on the PET film.

Example 7

The same procedure as in Example 2 was carried out except that the first release sheet was changed to a PTFE sheet having a pore size of 0.5 μm.

Example 8

The same procedure as in Example 2 was carried out except that the first release sheet was changed to a PTFE sheet having a pore size of 1 μm.

Example 9

The same procedure as in Example 2 was carried out except that the first release sheet was changed to a PVDF sheet.

Example 10

The same procedure as in Example 2 was carried out except that the first release sheet was changed to a cellulose sheet.

Example 11

Using the same material as in Example 1, a conductive membrane was provided on the first release sheet. Then, ethanol was sprayed onto the conductive membrane using an air brush and an excess amount of ethanol was removed while sucking the opposite surface of the first release sheet with an aspirator, so as to completely substitute the water content in the conductive membrane and the first release sheet with ethanol.

Commercially available qualitative filter paper made of cellulose was immersed in ethanol, taken out in a sufficient ethanol-containing state, and attached as the second release sheet from above the conductive membrane to thereby prepare a conductive membrane transfer sheet. This conductive membrane transfer sheet was stored in a zippered aluminum laminate bag for preventing the sheet from drying.

After a predetermined period, the conductive membrane transfer sheet was taken out from the aluminum laminate bag and used for transferring the conductive membrane to a PET film in the same manner as in the foregoing examples to thereby obtain a conductive object.

Example 12

Using the same conditions as in Example 11, water contained in the first release sheet and the conductive membrane was completely replaced with ethanol. Then, toluene was sprayed onto the conductive membrane using an air brush and an excess amount of toluene was removed while sucking the opposite surface of the first release sheet with an aspirator, so as to completely substitute the ethanol content in the conductive membrane and the first release sheet with toluene.

Commercially available qualitative filter paper made of cellulose was immersed in toluene, taken out in a sufficient toluene-containing state, and attached as the second release sheet from above the conductive membrane to thereby prepare a conductive membrane transfer sheet. This conductive membrane transfer sheet was stored in a zippered aluminum laminate bag for preventing the sheet from drying.

After a predetermined period, the conductive membrane transfer sheet was taken out from the aluminum laminate bag and used for transferring the conductive membrane to a PET film in the same manner as in the foregoing examples to thereby obtain a conductive object.

Example 13

A conductive membrane was provided on the first release sheet in the same manner as in Example 2. A dispersion liquid obtained from an aqueous dispersion of silver nanoparticles (average particle size: 30 nm, concentration: adjusted to 0.02 mass %) was further sprayed onto this conductive membrane using an air brush having a nozzle diameter of 0.3 mm. Water was drawn by sucking the opposite surface of the first release sheet with an aspirator, thereby furnishing a conductive membrane containing SWNT and silver nanoparticles. Then, the attachment of the second release sheet was conducted as in Example 2 to prepare a conductive membrane transfer sheet, which was stored for a predetermined period and then used for transferring the conductive membrane to a PET film in the same manner as in Example 2 to obtain a conductive object.

Example 14

A conductive membrane was provided on the first release sheet in the same manner as in Example 2. A dispersion liquid obtained from an aqueous dispersion of PEDOT/PSS (manufacturer: Aldrich, PEDOT:PSS=5:8, concentration: adjusted to 0.02 mass %) was further sprayed onto this conductive membrane using an air brush having a nozzle diameter of 0.3 mm. Water was drawn by sucking the opposite surface of the first release sheet with an aspirator, thereby furnishing a conductive membrane containing SWNT and PEDOT/PSS. Then, the attachment of the second release sheet was conducted as in Example 2 to prepare a conductive membrane transfer sheet, which was stored for a predetermined period and then used for transferring the conductive membrane to a PET film in the same manner as in Example 2 to obtain a conductive object.

Example 15

The same procedure as in Example 2 was carried out except that the first release sheet was changed to a PTFE sheet having a pore size of 0.2 μm, a thickness of 30 μm, and a size of 10 cm×10 cm, that the application amount of the dispersion liquid was changed, and that the second release sheet was changed to qualitative filter paper made of cellulose and having a size of 11 cm×11 cm.

Example 16

The same procedure as in Example 2 was carried out except that the first release sheet was changed to a PTFE sheet having a pore size of 0.2 μm, a thickness of 30 μm, and a size of 10 cm×10 cm, and that the second release sheet was changed to qualitative filter paper made of cellulose and having a size of 11 cm×11 cm.

Example 17

The same procedure as in Example 2 was carried out except that, in the preparation (transfer test) of a conductive object, a glass plate having a thickness of approximately 0.7 mm was used as the transfer target, and a commercially available hair dryer was used to apply hot air from above the first release sheet (i.e., from the second major surface side) in the heat application for water removal.

Example 18

The same procedure as in Example 2 was carried out except that, in the preparation (transfer test) of a conductive object, a glass sample bottle having a diameter of approximately 30 mm and a height of approximately 6 cm was used as the transfer target, and a commercially available hair dryer was used to apply hot air from above the first release sheet (i.e., from the second major surface side) in the heat application for water removal.

Example 19

The same procedure as in Example 2 was carried out except that the second release sheet was changed to an agar gel sheet. The agar gel sheet used here was obtained by spreading, over filter paper, a solution of agar powder dissolved in 80° C. hot water, and cooling the spread solution for 2 hours in a refrigerator.

Example 20

The same procedure as in Example 2 was carried out except that the second release sheet was changed to a gelatin gel sheet. The gelatin gel sheet used here was obtained by spreading, over filter paper, a solution of gelatin dissolved in 80° C. hot water, and cooling the spread solution for approximately 2 hours in a refrigerator.

Example 21

The same procedure as in Example 2 was carried out except that the second release sheet was changed to a sodium polyacrylate gel sheet sufficiently containing water.

Example 22

The preparation (transfer test) of a conductive object employed a conductive film transfer sheet prepared in the same manner as in Example 3 except that the first release sheet was changed to a PTFE sheet having a size of 3 cm×3 cm and that the second release sheet was changed to qualitative filter paper made of cellulose and having a size of 5 cm×5 cm.

In this preparation (transfer test) of a conductive object, a glass plate (4 cm×4 cm) having a hole of approximately 10 mmφ at its center was used as the transfer target, and the conductive membrane was transferred in the same manner as in Example 17 to thereby obtain a conductive object having a mono-material film of conductive fibers in the center part.

Comparative Example 1

A conductive membrane transfer sheet was prepared in the same manner as in Example 1 and left at room temperature for 3 hours. It was visually confirmed that the transfer sheet was dry. This conductive membrane transfer sheet was subjected to a transfer test in the same manner as in Example 1. Absolutely no transfer of the conductive membrane to the PET film was observed.

TABLE 1

| | Conductive membrane | | | First release sheet | | | | Second release sheet | | | | Time to transfer | Transferability | Surface resistance (Ω/cm²) | Transmittance (%) |
|---|---|---|---|---|---|---|---|---|---|---|---|---|---|---|---|
| | Conductive substance | Amount of sprayed dispersion liquid[(1)] | Impregnating liquid | Material | Shape | Thickness | Pore size | Material | Shape | Thickness | Substrate | | | | |
| Ex. 1 | CNT, single-walled | M | Water | PTFE | 47 mmφ | 60 μm | 0.2 μm | — | — | — | PET film | Instantly | A | 207 | 70 |
| Ex. 2 | CNT, single-walled | M | Water | PTFE | 47 mmφ | 60 μm | 0.2 μm | Paper | 50 mmφ | 0.5 mm | PET film | 3 hours | A | 214 | 71 |
| Ex. 3 | CNT, single-walled | L | Water | PTFE | 47 mmφ | 60 μm | 0.2 μm | Paper | 50 mmφ | 0.5 mm | PET film | 3 hours | A | 78 | 58 |
| Ex. 4 | CNT, single-walled | S | Water | PTFE | 47 mmφ | 60 μm | 0.2 μm | Paper | 50 mmφ | 0.5 mm | PET film | 3 hours | A | 585 | 79 |
| Ex. 5 | CNT, single-walled | M | Water | PTFE | 47 mmφ | 60 μm | 0.2 μm | Paper | 50 mmφ | 0.5 mm | PET film | 1 day | A | 688 | 78 |
| Ex. 6 | CNT, single-walled | M | Water | PTFE | 47 mmφ | 60 μm | 0.2 μm | Paper | 50 mmφ | 0.5 mm | PET film | 7 days | A | 149 | 67 |
| Ex. 7 | CNT, single-walled | M | Water | PTFE | 47 mmφ | 60 μm | 0.2 μm | Paper | 50 mmφ | 0.5 mm | PET film | 3 hours | A | 210 | 69 |
| Ex. 8 | CNT, single-walled | M | Water | PTFE | 47 mmφ | 60 μm | 0.2 μm | Paper | 50 mmφ | 0.5 mm | PET film | 3 hours | A | 248 | 68 |
| Ex. 9 | CNT, single-walled | M | Water | PVDF | 47 mmφ | 60 μm | 0.2 μm | Paper | 50 mmφ | 0.5 mm | PET film | 3 hours | C | 215 | 69 |
| Ex. 10 | CNT, single-walled | M | Water | Cellulose | 47 mmφ | 60 μm | 0.2 μm | Paper | 50 mmφ | 0.5 mm | PET film | 3 hours | B | 162 | 70 |
| Ex. 11 | CNT, single-walled | M | Ethanol | PTFE | 47 mmφ | 60 μm | 0.2 μm | Paper | 50 mmφ | 0.5 mm | PET film | 3 hours | A | 389 | 78 |
| Ex. 12 | CNT, single-walled | M | Toluene | PTFE | 47 mmφ | 60 μm | 0.2 μm | Paper | 50 mmφ | 0.5 mm | PET film | 3 hours | A | 601 | 79 |
| Ex. 13 | CNT, single-walled + silver nano-particles | M | Water | PTFE | 47 mmφ | 60 μm | 0.2 μm | Paper | 50 mmφ | 0.5 mm | PET film | 3 hours | A | 180 | 71 |
| Ex. 14 | CNT, single-walled + PEDOT/PSS | M | Water | PTFE | 47 mmφ | 60 μm | 0.2 μm | Paper | 50 mmφ | 0.5 mm | PET film | 3 hours | A | 95 | 66 |
| Ex. 15 | CNT, single-walled | L | Water | PTFE | 10 cm × 10 cm | 30 μm | 0.2 μm | Paper | 11 cm × 11 cm | 0.5 mm | PET film | 3 hours | | 81 | 80 |
| Ex. 16 | CNT, single-walled | M | Water | PTFE | 10 cm × 10 cm | 30 μm | 0.2 μm | Paper | 11 cm × 11 cm | 0.5 mm | PET film | 3 hours | A | 220 | 72 |
| Ex. 17 | CNT, single-walled | M | Water | PTFE | 47 mmφ | 60 μm | 0.2 μm | Paper | 50 mmφ | 0.5 mm | Glass plate | 3 hours | A | 107 | 65 |
| Ex. 18 | CNT, single-walled | M | Water | PTFE | 47 mmφ | 60 μm | 0.2 μm | Paper | 50 mmφ | 0.5 mm | Glass bottle | 3 hours | A | 390 | 81 |

TABLE 1-continued

| | | | | | | | | | | | | | | | | |
|---|---|---|---|---|---|---|---|---|---|---|---|---|---|---|---|---|
| Ex. 19 | CNT, single-walled | M | Water | PTFE | 47 mmφ | 60 μm | 0.2 μm | Agar gel | 50 mmφ | Approx. 1 mm | PET film | 3 hours | A | 226 | 73 |
| Ex. 20 | CNT, single-walled | M | Water | PTFE | 47 mmφ | 60 μm | 0.2 μm | Gelatin gel | 50 mmφ | Approx. 1 mm | PET film | 3 hours | A | 185 | 70 |
| Ex. 21 | CNT, single-walled | M | Water | PTFE | 47 mmφ | 60 μm | 0.2 μm | Sodium poly-acrylate gel | 50 mmφ | Approx. 1 mm | PET film | 3 hours | | 208 | 69 |
| Ex. 22 | CNT, single-walled | | Water | PTFE | 3 cm × 3 cm | 60 μm | 0.2 μm | Paper | 5 cm × 5 cm | 0.5 mm | Glass plate with hole | 1 hour | A[(3)] | 26.5 | 40 |
| Comp. Ex.1 | CNT, single-walled | M | Water | PTFE | 47 mmφ | 60 μm | 0.2 μm | — | — | — | PET film | 3 hours[(2)] | E | — | — |

[(1)]Amount of sprayed dispersion liquid: S = 3 to less than 5 seconds, M = 5 to less than 8 seconds, L = 8 to 12 seconds
[(2)]Period of being unattended at room temperature without storage in aluminum laminate bag
[(3)]A conductive film was present as an independent film at the hole region of the glass plate.

The present invention is not limited to the foregoing embodiments. For practical implementation, various modifications may be adopted without departing from the gist of the invention. Various embodiments may be discretionarily combined for implementation, and such combinations will produce combined effects. Moreover, the embodiments involve various aspects, and appropriate combinations of the disclosed features will permit various inventions to be derived. For example, if omission of several features from the entire configuration or structure disclosed for the embodiments can realize the intended object and provide the effects, the configuration or structure after such omission may be derived as an invention.

REFERENCE SIGNS LIST

1 . . . First release sheet
1a . . . First major surface
1b . . . Second major surface
2 . . . Conductive fiber
3 . . . Conductive membrane
4 . . . Second release sheet
5 . . . Substrate (transfer target)
10 . . . Conductive membrane transfer sheet
20 . . . Conductive membrane transfer sheet
30 . . . Conductive object

The invention claimed is:

1. A conductive membrane transfer sheet comprising:
a first release sheet comprising a liquid-permeable sheet; and
a second release sheet being a water-absorbing gel sheet of sodium polyacrylate, polyacrylamide, agar or carrageenan, or a water-absorbing paper; and
a conductive membrane comprising a conductive fiber located between and bonded to the first release sheet and the second release sheet,
wherein the first release sheet and the conductive membrane contain a first liquid,
the first liquid is water or contains water,
the first release sheet comprises pores with a pore size in a range of 0.05 μm to 5 μm and comprises one or more selected from polytetrafluoroethylene, polyvinylidene fluoride, polyvinylidene chloride, polypropylene, polyethylene, and polycarbonate,
a total mass of the first liquid contained in the first release sheet and the conductive membrane is in a range of 50 mass % to 200 mass % with respect to a mass of the first release sheet, and
wherein the second release sheet contains a liquid equivalent to the first liquid.

2. The conductive membrane transfer sheet according to claim 1, wherein the first liquid contained in the first release sheet and the conductive membrane is a dispersion solvent of a dispersion liquid for the conductive fiber used for forming the conductive membrane.

3. The conductive membrane transfer sheet according to claim 1, comprising at least a carbon nanotube as the conductive fiber.

4. The conductive membrane transfer sheet according to claim 3, further comprising, as the conductive fiber, a conductive fiber element other than the carbon nanotube.

5. The conductive membrane transfer sheet according to claim 1, wherein the first release sheet contains one or more materials selected from polytetrafluoroethylene, and polyvinylidene fluoride.

* * * * *